(12) United States Patent
Jehle

(10) Patent No.: US 12,296,814 B2
(45) Date of Patent: May 13, 2025

(54) CONTROL UNIT AND METHOD FOR DISTRIBUTING TORQUE IN THE EVENT OF A LOAD CHANGE

(71) Applicant: Vitesco Technologies GmbH, Regensburg (DE)

(72) Inventor: Martin Jehle, Pettendorf (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/829,360

(22) Filed: Sep. 10, 2024

(65) Prior Publication Data
US 2025/0002000 A1 Jan. 2, 2025

Related U.S. Application Data

(63) Continuation of application No. PCT/EP2022/083926, filed on Nov. 30, 2022.

(51) Int. Cl.
*B60W 20/10* (2016.01)
*B60W 20/15* (2016.01)
(Continued)

(52) U.S. Cl.
CPC ............. *B60W 20/15* (2016.01); *B60W 20/10* (2013.01); *B60W 20/17* (2016.01); *B60W 30/188* (2013.01);
(Continued)

(58) Field of Classification Search
CPC ...... B60W 20/15; B60W 20/10; B60W 20/17; B60W 30/188; B60W 2510/084; B60W 2710/083; B60W 2710/085
See application file for complete search history.

(56) References Cited

U.S. PATENT DOCUMENTS 11,427,087 B2 * 8/2022 Meyer ............... B60W 30/1882
2017/0355361 A1 * 12/2017 Yamazaki ............... B60K 6/28
(Continued)

FOREIGN PATENT DOCUMENTS

DE    102015015691 A1    6/2017
FR    3010030 A1    3/2015
(Continued)

OTHER PUBLICATIONS

European Search Report dated Feb. 13, 2023 for corresponding European Patent Application No. PCT/EP2022/083926.
(Continued)

*Primary Examiner* — Justin Holmes

(57) ABSTRACT

The disclosure relates to a method for distributing torque in the event of a load change for a motor vehicle. The motor vehicle has a first torque source that provide a first torque, and a traction motor that provides second torque. After determining that the torque distribution should be changed, the first torque is reduced, with a first gradient, from the positive torque range to a torque neutrality. At a specified load change time before the torque neutrality of the first torque is reached, the second torque of the traction motor is adjusted into the negative torque range with a specified second gradient until a predetermined load change range of the traction motor has been traversed. After the load change range has been traversed, the second torque is taken further into the negative torque range with a third gradient. The third gradient being steeper than the second gradient.

10 Claims, 2 Drawing Sheets

(51) Int. Cl.
*B60W 20/17* (2016.01)
*B60W 30/188* (2012.01)

(52) U.S. Cl.
CPC . *B60W 2510/084* (2013.01); *B60W 2710/083* (2013.01); *B60W 2710/085* (2013.01)

(56) References Cited

U.S. PATENT DOCUMENTS

2020/0039503 A1* 2/2020 Bowman ............... B60W 20/15
2020/0086874 A1* 3/2020 Burt ................... B60L 15/2009

FOREIGN PATENT DOCUMENTS

FR 3109337 A1 * 10/2021 ............... B60K 6/20
GB 2594289 A 10/2021

OTHER PUBLICATIONS

German Office Action dated Oct. 11, 2022 for corresponding German Patent Application No. 10 2022 202 419.2.

* cited by examiner

CONTROL UNIT AND METHOD FOR DISTRIBUTING TORQUE IN THE EVENT OF A LOAD CHANGE

CROSS-REFERENCE TO RELATED APPLICATIONS

This application claims the benefit of PCT Application PCT/EP2022/083926, filed Nov. 30, 2022, which claims priority to German Application 10 2022 202 419.2, filed Mar. 10, 2022. The disclosures of the above applications are incorporated herein by reference.

TECHNICAL FIELD

The disclosure relates to a method for distributing torque in the event of a load change from a positive torque range to a negative torque range for a motor vehicle. The motor vehicle has a first torque source, by which a first torque is provided, and a traction motor, by which a second torque is provided. The disclosure furthermore relates to a control unit which is designed to carry out the method and to a motor vehicle having such a control unit.

BACKGROUND

Troublesome load change effects, such as vibration or noise, arise in vehicles with an internal combustion engine, hybrid drive or electric drives when there is a rapid change in the torque demanded, in particular in the driver-demanded torque demanded by the driver by way of the gas pedal and/or brake pedal, which determines the forward propulsion of the vehicle. It is therefore customary to implement abrupt torque changes, e.g. those due to a sudden change in the gas pedal position, with a time delay by way of a filter, e.g. with the aid of a predetermined gradient limitation of the torque. Here, depending on the control structure, the torque can be considered from various reference points, e.g. as a wheel torque, in particular as a total torque of all the driving wheels, or as a clutch torque (transmission input torque).

Vibration is caused above all by elasticities in the drivetrain, giving rise to a vibratory system, and by non-linearities in the drivetrain, e.g. gearwheel flank changes. Such non-linearities take effect especially when the torque on the corresponding component changes sign since then gearwheels change from one contact surface to the other, for example. A similar effect is the tilting of the engine in its mounts when there is a change in the sign of the clutch torque which is associated with the non-linear characteristic of the engine mounts. Zero crossings of torques at certain positions in the drivetrain in positive or negative directions can therefore lead to particularly pronounced load change effects, which the driver perceives as troublesome.

SUMMARY

The disclosure provides an improved way to set the torque distribution in the event of a load change, thus reducing load change effects.

The disclosure is based on the concept that while the positive torque contribution of a first torque source, in particular an internal combustion engine, is being reduced, the torque of the second torque source, being a traction motor, is already being adjusted to a slightly negative torque, e.g. via a ramp, where the selected gradient of the second torque source is small in the range close to the zero crossing. Thus, the part of the drivetrain which is relevant for the traction motor is already preloaded and the load change effects can be reduced.

The disclosure provides a method for distributing torque in the event of a load change from a positive torque range to a negative torque range for a motor vehicle, where the motor vehicle has a first torque source, by which a first torque is provided, and a traction motor, by which a second torque is provided. In the method, that can be controlled by a control unit, after it has been determined that the torque distribution should be changed, the first torque is reduced, with a first gradient, from the positive torque range to a torque neutrality, where, at a specified load change time before the torque neutrality of the first torque is reached, the second torque of the traction motor is adjusted into the negative torque range with a specified second gradient until a predetermined load change range of the traction motor has been traversed, wherein, after the load change range has been traversed, the second torque is taken further into the negative torque range with a third gradient, wherein the third gradient is steeper than the second gradient. In particular, the third gradient can then be taken further as far as a driver-demanded torque which is to be set for the second torque.

In other words, the transition from the positive to the negative torque range that can be initiated by a driver of the motor vehicle takes place by virtue of the fact that, in a first step, the positive torque contribution of the first torque source is reduced to zero, i.e. the first torque is reduced to torque neutrality. Once the torque neutrality of the first torque source has almost been reached, the second torque of the traction motor can be adjusted into the negative torque range with a second gradient, for example, following a ramp, at a specified load change time before this torque neutrality is reached, in order to produce the desired negative driver demand. Here, the selected second gradient can be so small that, during the load change, a predetermined load change range of the traction motor close to the zero crossing is traversed and then remains in this state with a low negative torque until the first torque of the first torque source reaches torque neutrality. By way of this adjustment of the second torque into the negative torque range, the traction motor is preloaded. The second torque can then be adjusted further into the negative range with a third gradient, which is steeper than the second gradient, until the target value required for the driver demand has been reached.

The respective gradient refers to the slope with which the respective torque changes. Thus, the stipulation that the third gradient is steeper than the second gradient means that the absolute value of the slope of the third gradient into the negative torque range is greater than the absolute value of the slope of the second gradient into the negative torque range. The respective gradients do not have to be constant but can be specified by way of a table in accordance with the current torque value, for example. The motor vehicle can be a purely electrically operated motor vehicle, for example, with both the first torque source and the traction motor thus being designed as electric motors. In some examples, the motor vehicle can be designed as a hybrid vehicle, which means that, in addition to the traction motor, the first torque source is designed as an internal combustion engine. A traction motor refers to an electric motor which can drive the motor vehicle in a purely electric way, for example, generates forward propulsion in the positive torque range and deceleration, in particular regeneration, in the negative torque range. The first and/or second torque can be a wheel torque, such as a total wheel torque, a clutch torque and/or an axle torque of the respective torque source.

The load change range is the region of the load change transition close to the zero crossing of the traction motor in which the preloading of the traction motor is complete. In particular, the load change range is the region in which the tooth flanks of the transmission stages of the traction motor rest on the appropriate side. This load change range can be different for each motor vehicle, and it is therefore predetermined individually for each motor vehicle. In other words, the extent to which the traction motor for the respective motor vehicle must be adjusted into the negative torque range to complete the preloading process is predetermined.

Owing to the fact that the traction motor is brought into a state with a low negative torque while the positive torque contribution of the first torque source is still being reduced, it is possible, around the region of the torque zero crossing or torque neutrality, to achieve preloading of the traction motor, allowing a more rapid buildup of a negative torque. This results in the advantage that it is possible to achieve a highly dynamic response by the drivetrain during the load change transition while simultaneously avoiding troublesome load change effects, allowing a good combination of dynamic response and ride comfort. In general terms, the preloading of the traction motor increases the dynamic response of the buildup of the negative torque since, for example, the tooth flanks of a transmission stage are already in contact on the correct side.

The disclosure also encompasses examples that afford additional advantages.

In some implementations, the load change time and the second gradient are specified in such a way that the traversal of the predetermined load change range by the second torque is completed when the first torque reaches torque neutrality. In other words, the times for the torque neutrality of the first torque and the completion of the traversal of the load change range of the second torque coincide. This example results in the advantage that the load change time and the second gradient can be precisely specified in order to match the traversal of the load change range to the torque neutrality of the first torque. It is thereby possible to increase the dynamic response of the drivetrain since it is possible to achieve a particularly smooth approach of the first torque source to torque neutrality while avoiding load change effects due to the traction motor.

In some implementations, the adjustment of the second torque into the negative torque range is carried out by regeneration. That is to say that the traction motor can be adjusted into the negative torque range by way of regeneration, thereby enabling electric energy to be recovered from the kinetic energy of the motor vehicle. This example results in the advantage that a more rapid transition to regeneration can be achieved, e.g. by avoiding the use of the friction brake, and, as a result, fuel consumption is reduced overall.

In some examples, the reduction in the first torque to torque neutrality is slowed down to the extent to which the second torque is being built up. In other words, as the second torque is adjusted into the negative torque range, the first gradient is flattened by the absolute value of the second gradient. It is thereby possible to achieve a particularly smooth approach of the first torque source to torque neutrality, something that can counteract possible load change effects from the region of the first torque source. Moreover, it is possible in this way to maintain a certain advantageous gradient for the sum of the two torques.

In some implementations, if the second torque is in a positive torque range, it is reduced before the first torque to torque neutrality or a low torque representing the upper limit of the load change range, before the torque is adjusted into the negative torque range at the load change time. In particular, if the second torque is in a higher positive torque range than the first torque, the second torque can be brought to torque neutrality with a steeper gradient. If there is a smaller proportion of the second torque than the first torque in the positive torque range, provision can be made for the second torque to be reduced in parallel with the first torque, in particular with the first gradient, initially to torque neutrality or to the upper limit of the load change range, before it is adjusted into the negative torque range at the load change time. This example results in the advantage that the second torque can be biased into the negative torque range before the first torque reaches torque neutrality, and it is possible in this way to avoid troublesome load change effects. In addition, it is possible to start more quickly with regeneration, thereby saving fuel.

In some implementations, the first torque source is an internal combustion engine. That is to say that the motor vehicle is a hybrid vehicle, which has an internal combustion engine as a first torque source and the traction motor as a second torque source. In particular, the hybrid vehicle can have a parallel hybrid drive in one of the categories P0 to P4.

The first torque source may be decoupled from a drivetrain of the motor vehicle and/or deactivated when torque neutrality is reached. In this way, it is possible, for example, to open a clutch to disconnect the first torque source, in particular to disconnect the internal combustion engine, which, as a consequence, can additionally be switched off without producing a load change effect. The first torque source thus does not make a negative torque contribution, and this increases energy recovery by regeneration with the traction motor.

In some examples, the first torque source is an electric motor. In other words, the first torque source, particularly in the case of an internal combustion engine, can have an additional further electric machine (starter generator) which makes a contribution to the first torque. As an alternative, the first torque source can also be a further traction motor, and therefore the motor vehicle is of fully electric design.

Another aspect of the disclosure relates to a control unit for a motor vehicle, where the control unit is designed to carry out a method according to one of the preceding implementations. In particular, the control unit can be designed, upon determining that a torque distribution should be changed, to reduce the first torque, with a first gradient, from the positive torque range to a torque neutrality, and, at a specified load change time before the torque neutrality of the first torque is reached, to adjust the second torque of the traction motor into the negative torque range with a specified second gradient until a predetermined load change range of the traction motor has been traversed, and, after the load change range has been traversed, to take the second torque further into the negative torque range with a third gradient, wherein the third gradient is steeper than the second gradient. For this purpose, it is possible, for example, for the control unit to produce control signals, which can be sent to the first torque source and/or the traction motor in order to perform the corresponding adjustments. With this aspect of the disclosure, the same advantages and possibilities of variation are obtained as with the method.

According to the disclosure, a motor vehicle having a control unit in accordance with the preceding aspect is also provided.

The disclosure also includes further developments of the control unit according to the disclosure which have features such as those which have already been described in connection with the further developments of the method according to the disclosure. For this reason, the corresponding further developments of the control unit according to the disclosure are not described again here.

The disclosure also includes the combinations of the features of the implementations described.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

The disclosure describes components of the implementation, each represent individual features that should be considered independently of one another and that each also develop the disclosure independently of one another and can therefore also be considered to be part of the disclosure individually or in a combination other than that shown. Furthermore, the examples described may also be supplemented by further features of the disclosure that have already been described.

Figure 1:
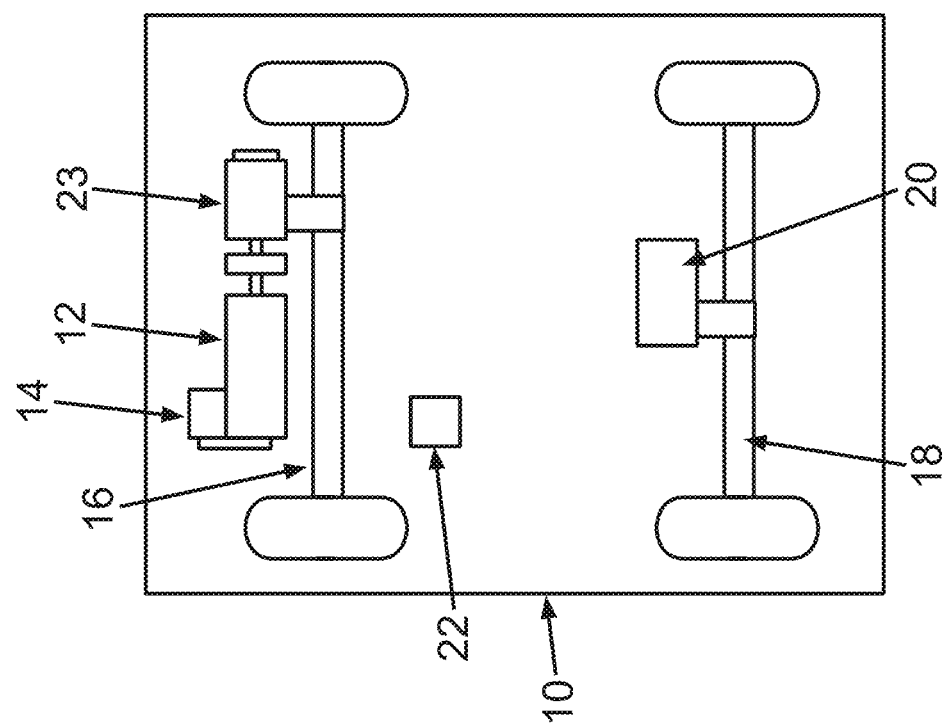
FIG. 1 shows a schematically illustrated exemplary motor vehicle.

FIG. 1 is a schematically illustrated exemplary motor vehicle 10. As shown, the motor vehicle 10 can be a hybrid vehicle, having an internal combustion engine 12 and a starter generator 14 on the front axle 16 of the motor vehicle. The internal combustion engine 12 and the starter generator 14 are taken together as a first torque source, which provides a first torque. The hybrid vehicle, which is designed as a P4-category hybrid in this example, can have a traction motor 20 on the rear axle 18. In this case, the total wheel torque can, in principle, be distributed in any way desired between the front and rear axles 16, 18, with the result that, in the event of a change in the total wheel torque, the axle torques at the front and rear axles 16, 18 may exhibit zero crossings at different times. In this case, relative non-linearities are, for example, gearwheel stages in the reduction gear at the rear axle 18 and transmission gearwheel stages or the characteristic of the engine block mounting at the front axle 16.

Figure 2:
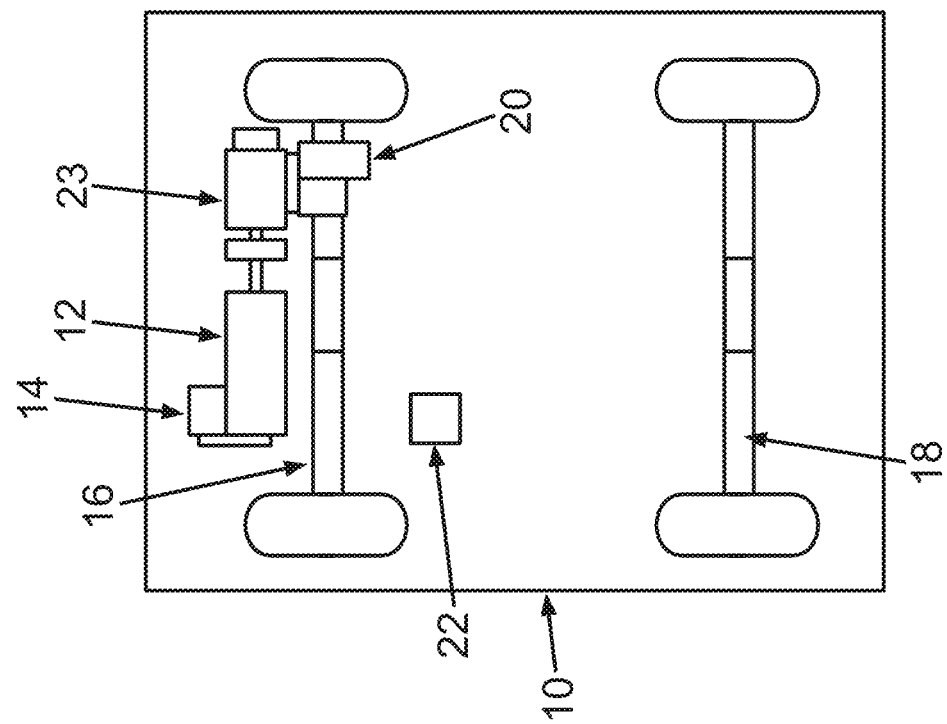
FIG. 2 shows a schematically illustrated exemplary motor vehicle.

Another example of the motor vehicle 10 is illustrated in FIG. 2. As shown in FIG. 2, the motor vehicle 10 is designed as a P3-category hybrid with a traction motor 20 having a gearwheel stage on the output side of the transmission 23 as well as the internal combustion engine 12 and a starter generator 14 on the input side of the transmission 23. In this case, the clutch torque (transmission input torque corresponds to the sum of the torque of the internal combustion engine, the starter generator torque and any losses of mechanically driven auxiliary units) and the torque of the traction motor 20 can exhibit zero crossings at different times. Here, non-linearities in the transmission can produce load change effects during the zero crossing of the clutch torque. Flank changes in the gearwheel stage can produce load change effects when there is a change in the sign of the torque in the gearwheel stage of the traction motor 20.

The motor vehicles 10 shown in FIGS. 1 and 2 are merely illustrative examples, and the motor vehicle can also be designed as a P2- or P2.5 hybrid or as a purely electrically operated vehicle.

The combination of the internal combustion engine 12, the starter generator 14 and/or mechanically driven auxiliary units is referred to below as the first torque source, which provides a first torque. Accordingly, the traction motor 20 represents a second torque source, which provides a second torque, where the second torque source can generally likewise have a plurality of torque contributors, e.g. a plurality of traction motors, the torque of which is cumulative.

In the event of a load change, such as from a positive torque range or propulsion torque, to a negative torque range, troublesome load change effects can occur, which can arise especially from elasticities in the drivetrain and non-linearities in the drivetrain, in particular gearwheel flank changes. To reduce and avoid, these load change effects, it is possible to provide a control unit 22 which controls the torque distribution in the event of a load change. This method, which is carried out by the control unit 22, is explained below with the aid of FIG. 3.

Figure 3:
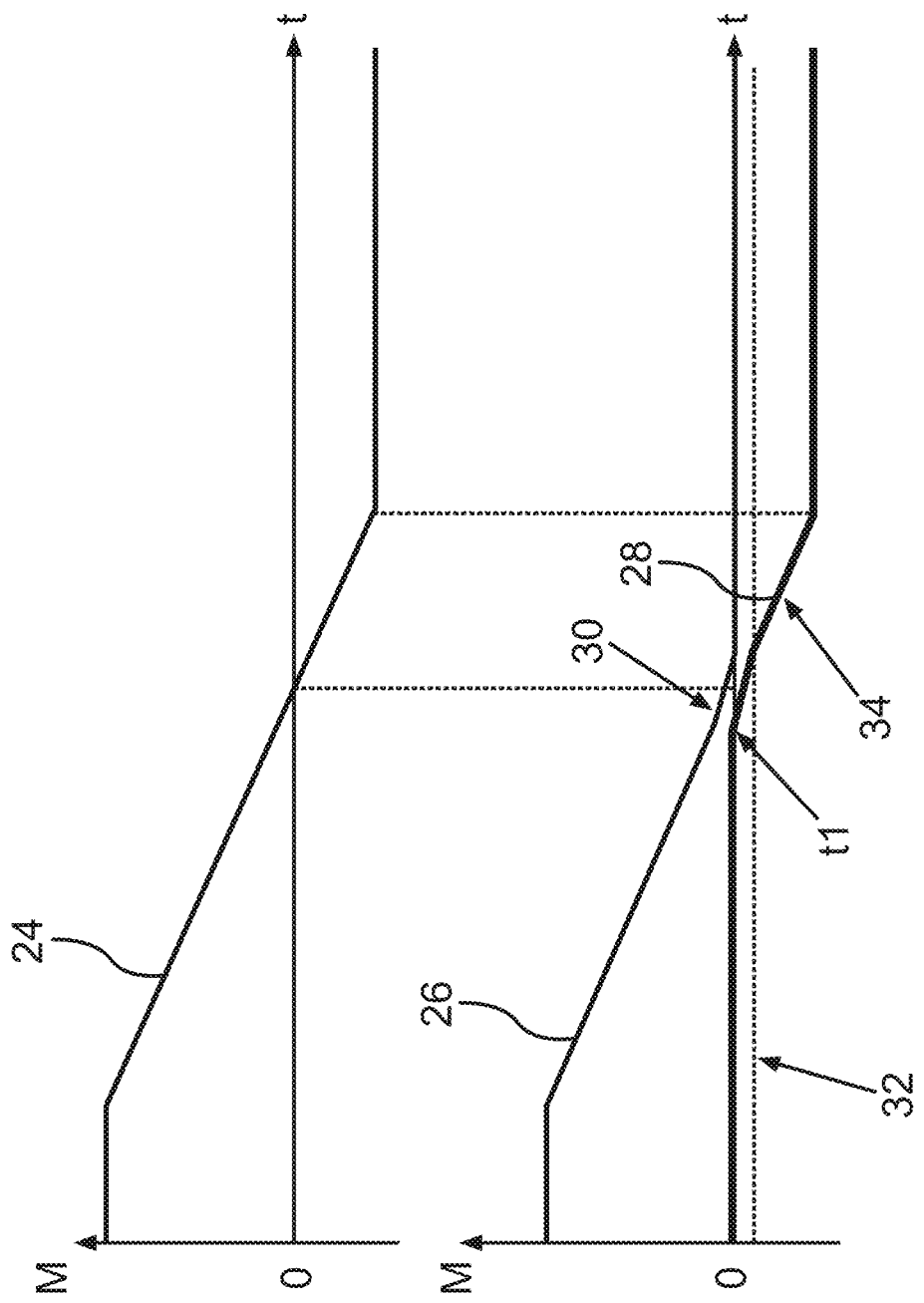
FIG. 3 shows an exemplary diagram relating to the torque distribution.

In FIG. 3, the progress of time t is illustrated on the respective x axis, and the (total) wheel torque M is illustrated on the y axis. The driver demand 24 or driver-demanded torque is illustrated in the upper half of the diagram in FIG. 3. The driver demand 24 illustrates the total wheel torque of the motor vehicle 10 that is to be set, and this can be implemented, for example, by changing the gas pedal position and/or actuating the brake.

The bottom half of the diagram illustrates the wheel torque contributions of the first torque source 12, 14, which is referred to below as the first torque 26, and the wheel torque contribution of the traction motor, which is referred to below as the second torque 28. The sum of the wheel torque contributions gives the total wheel torque M that corresponds to the driver demand 24.

To carry out the method and to avoid load change effects, the control unit 22 can, in compliance with the driver demand 24, reduce the first torque 26, which is in a positive torque range, with a first gradient or a first slope in order to achieve torque neutrality (M=0) for the first torque. Just before the first torque 26 reaches torque neutrality, the second torque 28 can be adjusted into the negative torque range with a specified second gradient at a time t1, which is specified as load change time t1. Here, the second gradient is specified in such a way that the load change of the traction motor 20 is started gently without already causing load change effects due to an excessively quick change in the torque. Thus, the traction motor 20 is brought into a state with a low negative torque while the positive torque contribution of the first torque source 12, 14 is still being reduced. At the load change time t1, the reduction in the first torque 26 may also be slowed down to the same extent as the second torque 28 is being built up, this being indicated in region 30 of FIG. 3, with the result that the sum of the torque contributions continues to correspond to the driver demand 24.

The second gradient of the second torque 28 and the load change time t1 are chosen in such a way that a predetermined load change range 32 has been traversed precisely when the first torque source 26 reaches torque neutrality. Here, the load change range 32 indicates the torque threshold at which the load change of the traction motor 20 is complete. Once torque neutrality of the first torque 26 has been reached and the load change range 32 has been traversed by the second torque 28, the second torque 28 can be taken further into the negative torque range with a third gradient, which is indicated in region 34 and which is steeper than the second gradient, in order to comply with the driver demand 24. Here, adjustment of the second torque 28 into the negative torque range can be accomplished by regeneration in order to obtain energy recovery. In addition, after torque neutrality of the first torque 26 has been reached, the first torque source 12, 14 can be decoupled from a drivetrain of the motor vehicle 10 and/or deactivated in order to save fuel.

Overall, the examples show how the disclosure can be used to control a torque distribution, such as in hybrid vehicles, in order to avoid troublesome load change effects.

A number of implementations have been described. Nevertheless, it will be understood that various modifications may be made without departing from the spirit and scope of the disclosure. Accordingly, other implementations are within the scope of the following claims.

What is claimed is:

1. A method for distributing torque when a load change from a positive torque range to a negative torque range for a motor vehicle, the method comprising:
   providing a first torque source having a first torque supported by the motor vehicle;
   providing a traction motor having a second torque;
   after determining that the torque distribution should be changed, reducing the first torque with a first gradient, from the positive torque range to a torque neutrality;
   at a specified load change time before the torque neutrality of the first torque is reached, adjusting the second torque of the traction motor into the negative torque range with a specified second gradient until a predetermined load change range of the traction motor has been traversed; and
   after the load change range has been traversed, further adjusting the second torque into the negative torque range with a third gradient, the third gradient is steeper than the second gradient.

2. The method of claim 1, wherein the load change time and the second gradient are specified in such a way that the traversal of the predetermined load change range by the second torque is completed when the first torque reaches torque neutrality.

3. The method of claim 1, wherein the adjustment of the second torque into the negative torque range is carried out by regeneration.

4. The method of claim 1, wherein the reduction in the first torque to torque neutrality is slowed down to the extent to which the second torque is being built up.

5. The method of claim 1, wherein, if the second torque is in a positive torque range, the second torque is reduced before the first torque to torque neutrality or a low torque representing an upper limit of the load change range, before the torque is adjusted into the negative torque range at the load change time.

6. The method of claim 1, wherein the first torque source is an internal combustion engine.

7. The method of claim 1, wherein the first torque source is decoupled from a drivetrain and/or deactivated when torque neutrality is reached.

8. The method as of claim 1, wherein the first torque source has an electric motor.

9. A control unit for a motor vehicle, wherein the control unit is designed to carry out the method of claim 1.

10. A motor vehicle having a control unit of claim 9.

* * * * *